No. 776,467. PATENTED NOV. 29, 1904.
W. W. HOSKINS.
COTTON PICKER.
APPLICATION FILED JUNE 30, 1903.
NO MODEL. 5 SHEETS—SHEET 1.
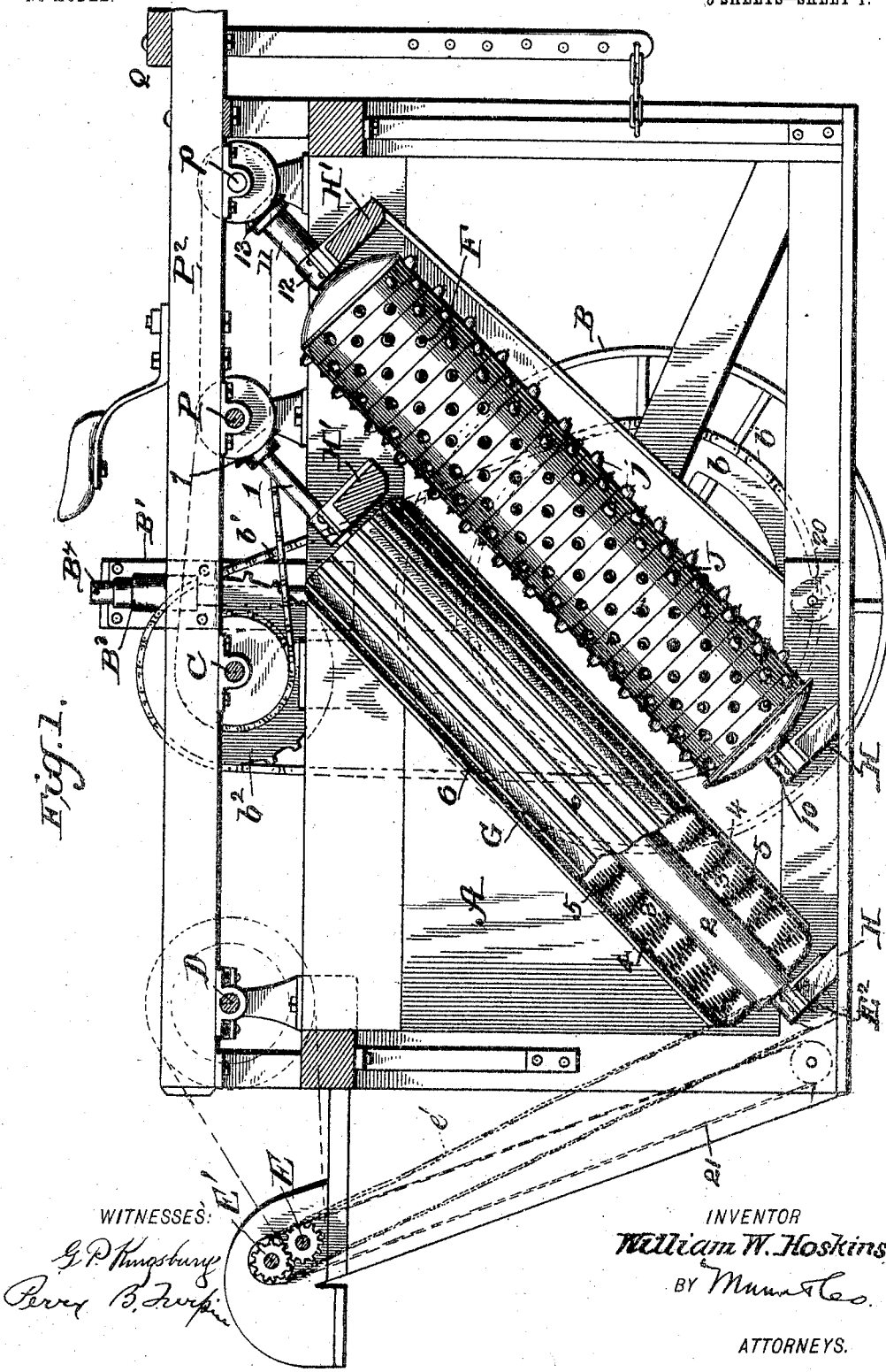
WITNESSES:
G. P. Kingsbury
Percy B. Twipin
INVENTOR
William W. Hoskins,
BY Munn & Co.
ATTORNEYS.

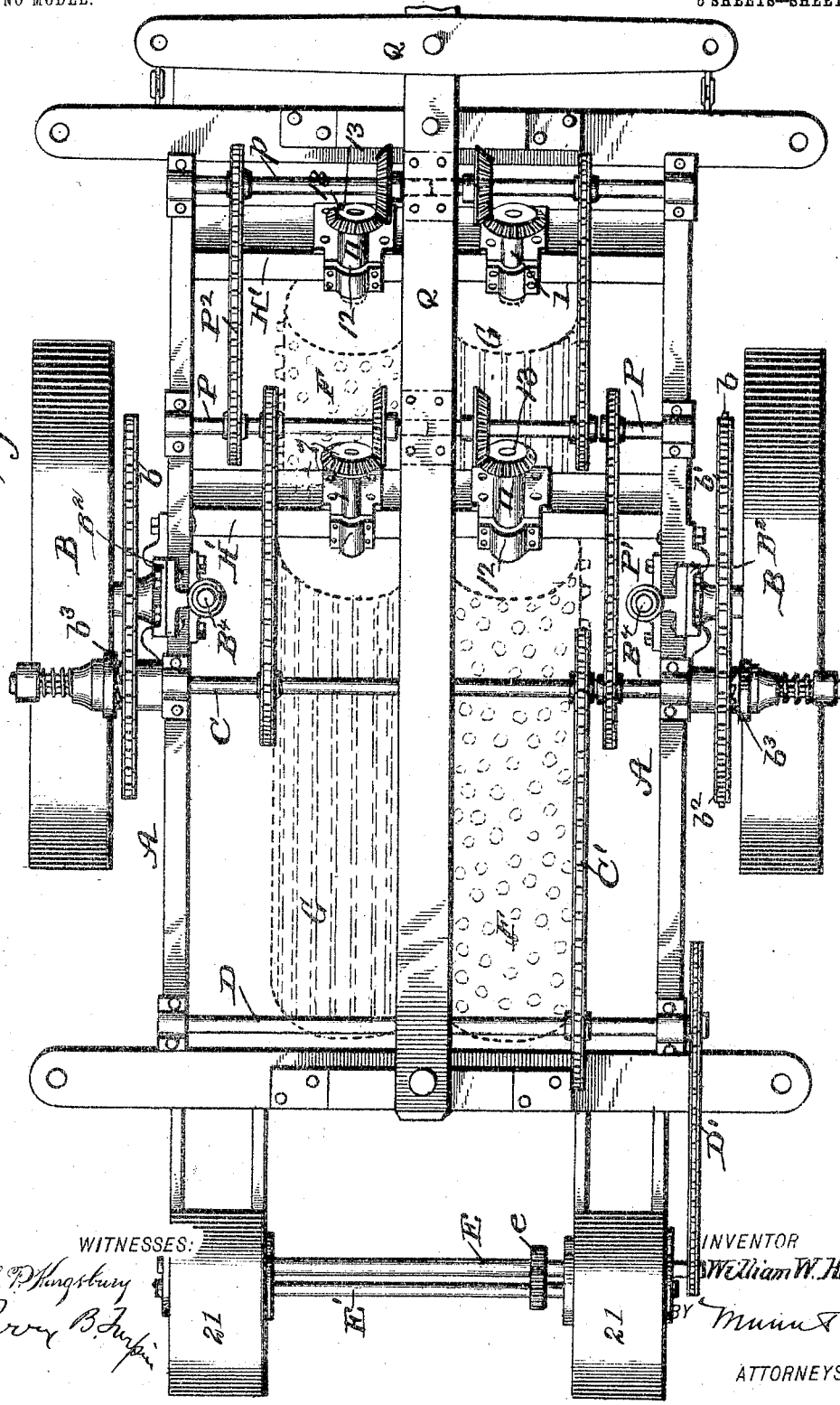

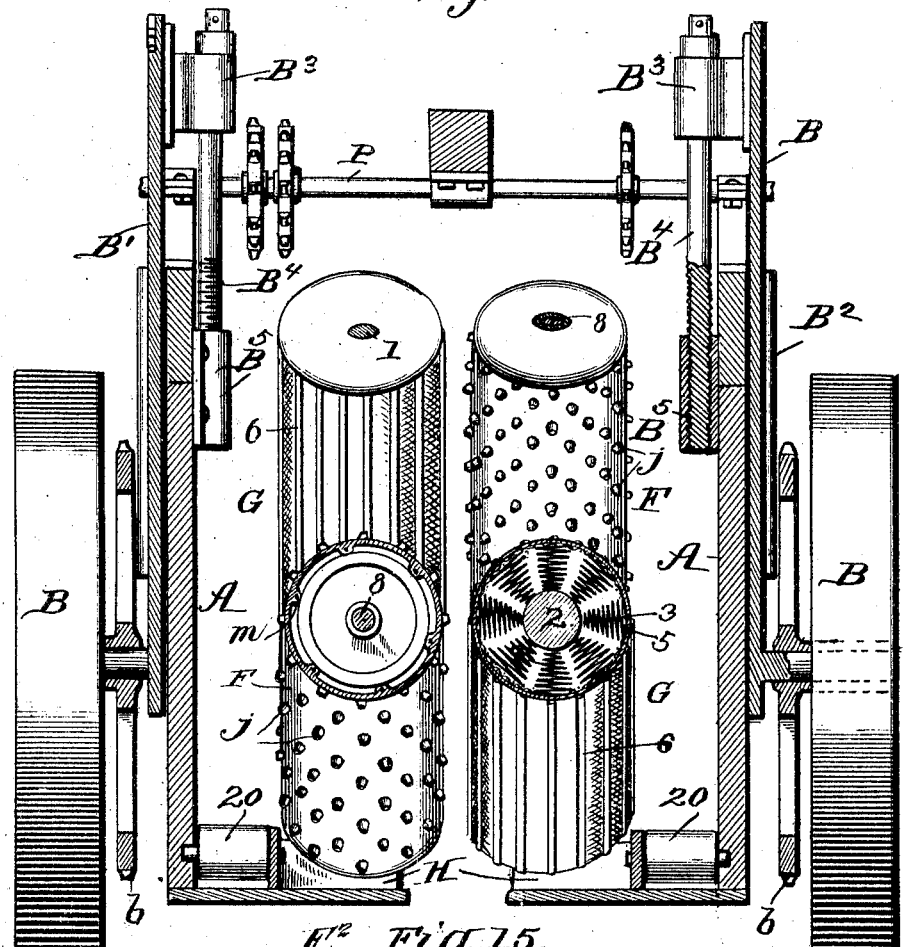
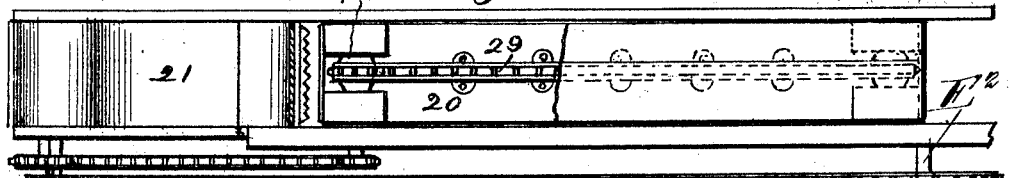

No. 776,467. PATENTED NOV. 29, 1904.
W. W. HOSKINS.
COTTON PICKER.
APPLICATION FILED JUNE 30, 1903.
NO MODEL. 5 SHEETS—SHEET 4.
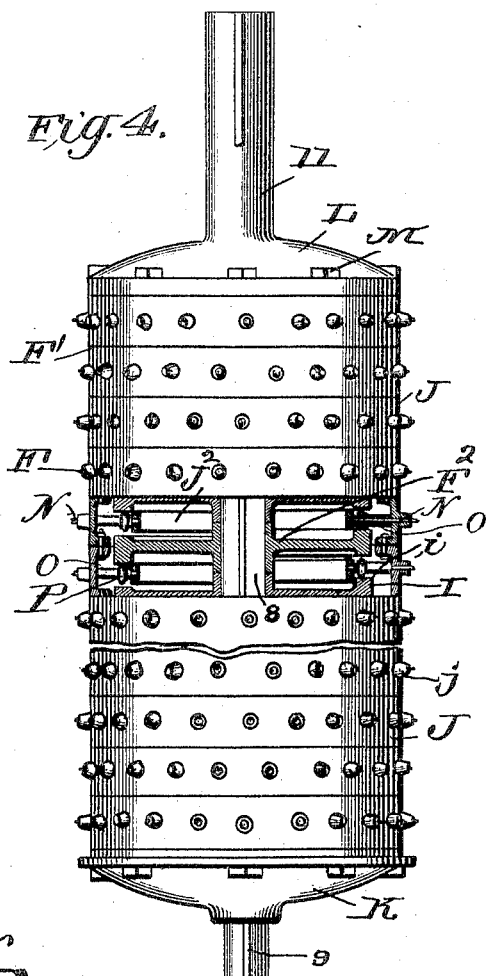
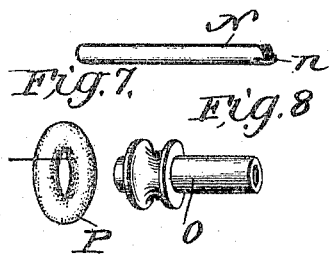
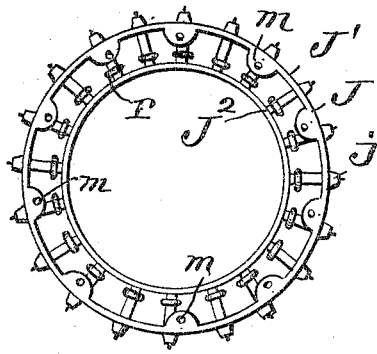
WITNESSES:
INVENTOR
William W. Hoskins
BY
ATTORNEYS.

No. 776,467. PATENTED NOV. 29, 1904.
W. W. HOSKINS.
COTTON PICKER.
APPLICATION FILED JUNE 30, 1903.
NO MODEL. 5 SHEETS—SHEET 5.
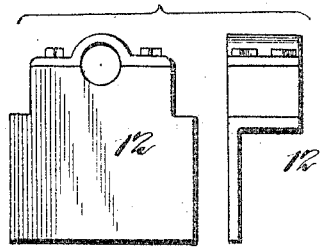
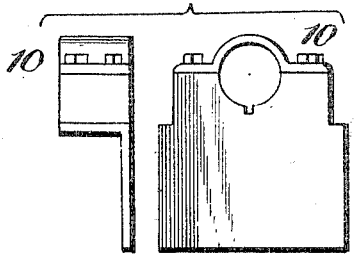
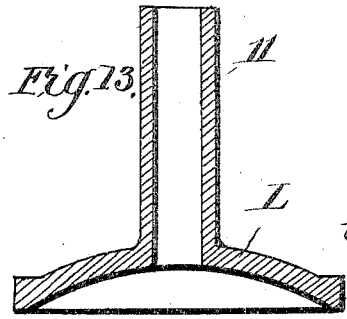
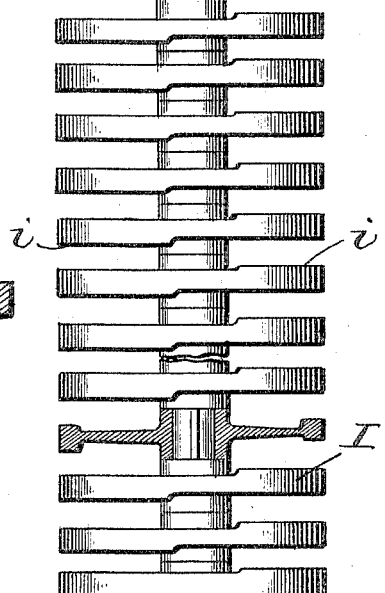
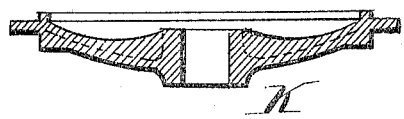
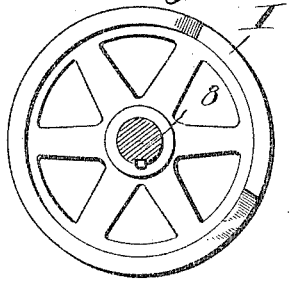
WITNESSES:
INVENTOR
William W. Hoskins
BY Munn & Co.
ATTORNEYS.

No. 776,467. Patented November 29, 1904.

UNITED STATES PATENT OFFICE.

WILLIAM WHARTON HOSKINS, OF VELASCO, TEXAS.

COTTON-PICKER.

SPECIFICATION forming part of Letters Patent No. 776,467, dated November 29, 1904.

Application filed June 30, 1903. Serial No. 163,738. (No model.)

*To all whom it may concern:*

Be it known that I, WILLIAM WHARTON HOSKINS, a citizen of the United States, residing at Velasco, in the county of Brazoria and State of Texas, have made certain new and useful Improvements in Cotton-Pickers, of which the following is a specification.

My invention is an improvement in cotton-pickers, having for an object, among others, to provide a machine in which the picking devices slant from their ground ends forwardly instead of rearwardly or vertically, whereby they will come in contact with the top of the plant first and will pick down, thus having an upward and backward pull on the plant in operation, and also to construct the picking devices of a picking-roller and an opposing feed-roller correspondingly inclined, and to provide other means, as will be more fully described; and the invention consists in certain novel constructions and combinations of parts, as will be hereinafter described and claimed.

In the drawings, Figure 1 is a side elevation, partly in section, of a machine embodying my invention. Fig. 2 is a top plan view thereof. Fig. 3 is a sectional front elevation of the machine. Fig. 4 is a detail elevation, partly in section, of the picking-roller. Fig. 5 is a detail plan view of one of the sections of the shell of the picker. Fig. 6 is a detail side elevation of one of the pickers. Fig. 7 is a detail perspective view of one of the rubber rings for the picker-pulley. Fig. 8 is a detail perspective view of the picker-pulley. Fig. 9 is a detail side elevation, partly in section, of the driving-cams for the picker-rolls and their supporting-shaft. Fig. 10 is a front elevation thereof. Fig. 11 is a detail view of the bearing for the lower end of the cam-shaft. Fig. 12 is a detail view of the bearing for the picking-roller. Figs. 13 and 14 are detail sectional views of the upper and lower end sections of the shell of the picking-roller. Fig. 15 is a detail plan view, parts broken away, of the carrier and elevating mechanism for the picked cotton; and Fig. 16 is a rear elevation of the upper portion of the elevator.

In the construction shown I construct my machine with a suitable frame A, mounted upon the wheels B, one at each side, as shown in Figs. 2 and 3. These wheels are journaled on bearings carried by the lower ends of uprights B′, which are moved vertically in guides $B^2$, mounted on the outer sides of the framing A and project above the said framing, as best shown in Fig. 3. Near their upper ends and on their inner sides the upright bars B′ are provided with vertical bearings $B^3$, in which journal adjusting-screws $B^4$, whose lower ends are threaded in bearings $B^5$, secured to the frame A, as best shown in Fig. 3. By turning these screws $B^4$, which may be accomplished in any suitable manner, the frame A may be adjusted up and down with respect to the wheels B, and, if desired, one may be set higher or lower at either side to accommodate the use of the machine on a hillside. To the wheels B are fixed the sprocket-wheels $b$, by which power is transmitted from the wheel B to the moving parts of the machine.

Within the framing A and at the opposite sides of the machine I provide carrier-belts 20, which operate to convey the cotton delivered thereto by the picking-rollers to the rear of the machine and deliver it to the elevators 21, which carry the cotton upwardly and discharge it to any suitable receptacle. The means for driving these carriers and elevators will be described in detail hereinafter.

The sprocket-wheels $b$ are connected by sprocket-chains $b'$ with sprocket-pulleys $b^2$, which are clutched on the main drive-shaft C, the clutches $b^3$ being so arranged (see Fig. 2) that the main drive-shaft C will be driven as the machine moves forward, but will not be turned on backing the machine. This shaft C is connected by a sprocket-belt C′ with a counter-shaft D, which connects by a belt D′ with a second counter-shaft E, which is geared at $e$ with the upper shaft E′ of the elevators 21, said upper shaft E′ being connected by a sprocket-chain $e'$ with the front shaft $E^2$ of the carrier 20.

I arrange the picking-rollers F and the feeding-rollers G in pairs side by side, and when I use two or more pairs of rollers I dispose them alternately—that is to say, when two pairs are used I arrange the rear feed-roller behind the front picking-roller and the rear picking-roller behind the front feed roller—thus reversing the rear pair of rollers with respect to the first, so that the picking-rollers of the front and rear pair are arranged diagonally and the feeding-rollers are correspondingly arranged. By this arrangement, as the cotton-plant passes through the machine the cotton is picked first from one side and then from the other side of the growing plant. It should be understood, however, that, if desired, only one pair of rollers—namely, one picking-roller and its coöperating feed-roller—may be used, picking from only one side at a time and rendering it necessary to pass over the row of plants twice in order to pick the cotton from both sides. A machine of this kind could be made to accommodate those not able to buy machines having the two pairs of rollers.

The picking-rollers F and their coöperating feed-rollers are arranged side by side and incline forwardly toward their upper ends. In practice I prefer to arrange the rollers at an angle of about forty-five degrees; but I find in practice that they may be inclined at an angle of as much as sixty degrees from the perpendicular, but no more, as if they more nearly approach the horizontal they will operate to drag the plant down. For this reason I find it necessary that the roller should be at an angle of not more than sixty degrees to the perpendicular in order that they may operate as desired.

Bearing-blocks H support bearings for the lower ends of the picking and feeding rollers, and bearing-bars H' support the bearings for the upper ends of said rollers, as best shown in Fig. 1.

The feeding-rollers G are of a special construction, comprising a shaft 1, on which is fitted a core 2, a plurality of radial projecting coil-springs 3 on the core and held at their outer ends by a strong cord or lacing 4 and covered by a fabric 5, of canvas or the like, on the outer side of which are secured longitudinal slats or strips 6, of leather or other suitable material, which may be secured by riveting or otherwise, as may be desired. This provides a yielding roller, which will not injure the plants and whose ribs will properly feed the bolls to the picking-rolls and hold them in position for proper operation by the said rolls, as may be desired. These feed-rollers have their shafts 1 provided at their upper ends with bevel-gears 7, which are meshed by bevel-gears on cross-shafts driven from the drive-shaft C in the manner presently described.

The picking-rollers F are shown in detail in Figs. 4, 5, 6, 7, 8, and 9 and include the shell F' and the inner or cam portion F$^2$, the latter being shown in section in Fig. 4 and in side elevation in Fig. 5. The cam portion F$^2$ is stationary, and the casing F revolves thereabout, so that its pickers will receive motion from the cam-disks of the cam portion F$^2$ in the manner presently described. The cam portion F$^2$ includes the shaft 8, whose lower end 9 is keyed in the bearing 10 on the base-block H, while its upper end extends within the tubular bearing-neck 11 at the upper end of the shell F'. On the shaft 9 are secured the plurality of cam-disks I, which are spaced apart slightly to permit the friction-pulleys on the pickers to operate between them and are provided on their edges with the cam rails or surfaces $i$, which operate upon the friction-pulleys and serve to turn them first in one direction and then the other as the shell carrying said pulleys is revolved around the cam portion F$^2$. It will be noticed especially from Fig. 9 that the rails $i$ of two adjacent cam-disks I project into the space between the said disks at different portions of the circumference of the disk, so that as the shell carrying the revolving pickers is revolved around the portion F$^2$ the rollers or friction-pulleys of the pickers will be operated one at the left of the shaft 8 (see Figs. 4 and 9) by the upper disk of any particular pair and when at the right of said shaft will be operated by the cam-surface $i$ of the lower disk of said pair and will when between the said surfaces $i$ be free, so that the said picker will first be turned in one direction, then will be permitted to stop, then will be turned in the opposite direction, so that when turned in one direction it may pick the cotton from the bolls, may then rest for a moment before it is turned in the opposite direction to discharge the cotton to the carriers 20 by the revolution of the pickers in the reverse direction, as will be better understood from what follows. The shell F' is composed of a number of ring-sections J, one of which is shown in plan in Fig. 5, and the lower end section K and the upper end section L, the sections J, K, and L, being secured together by the bolts M, which connect the adjacent sections and rings and hold the rings tightly together, and so secure the several parts of the shell rigidly together. Each section J is composed of an outer ring J' and an inner ring J$^2$, the latter operating between the adjacent disks I of the cam portion F$^2$ and affording a bearing for the inner ends of the picker-shafts, presently described. The outer ring J' is provided with a circular series of outwardly-projecting cones $j$, in which the outer ends of the picker-shafts turn and beyond which they project, as best shown in Figs. 4 and 5. These pickers have the shafts N, the pulleys O, and the sleeves in which the shafts N are secured and the rubber or other yielding rim P, secured in the pulley of the sleeve O and affording a frictional bearing to operate upon the cam-surfaces $i$ of the disks I. At their outer ends picker-shafts N have the ratchet-teeth or drill-like ends $n$, which when turned in one direction operate to strip the cotton from the bolls, and when turned in the opposite direction tend to release the cotton, the shafts being so arranged that they will be turned in the proper direction to pick the cotton when in contact with the cotton on the plants, and will then be reversed and moved in the opposite direction in order to release the cotton so it may fall into the carriers 20 after the pickers have picked cotton from the plant and reached the position over the said carriers. By providing a period of rest between the two directions of movement of the picker-shaft I avoid the wear incident to quickly reversing the direction of rotation of the said shaft, as will be understood. At its upper end the picker journals by sleeve 11 in the bearing 12 and has fixed on its upper end a bevel-gear 13, which is meshed by a bevel-gear on its driving-shaft. To drive the rollers of the rear pair, I provide shafts P, supplied with bevel-gears meshing with the gears 7 and 13 of the rear rollers, said shafts P being geared by sprocket-belts P' with the drive-shaft P and being also geared by sprocket-chains $P^2$ with cross-shafts $p$, having bevel-gears meshing with the bevel-gears 7 and 13 of the front pair of rollers, as will be understood from Figs. 1 and 2 of the drawings.

The specific construction of the rearwardly traveling belts or carriers 20, and the elevators 21 and their relation to other parts of the machine will be best understood on reference to Figs. 15 and 16, and from these figures it will be noticed the carriers 20 are driven by the sprocket-chain D', (see Figs. 2 and 15,) and the rollers at the opposite ends of the carriers are connected together by the sprocket-chain 29, to which the carriers 20 are secured, the whole being arranged so the carriers will convey the picked cotton to the rear of the machine and deliver it to the elevators, so it can be discharged at an elevated point, as desired.

In the practical operation of my machine, a forward movement thereof will turn the forwardly-slanting picking and feeding rollers and cause the picking spindles or shafts to turn in the proper direction to engage and draw the cotton from the bolls, the plants and bolls being held first on one side and then on the other by the feeding-rollers, and the cone-shape projections on the picking-roller aiding the picker-spindles in getting a deeper hold on the cotton, and the cotton being released from the picking spindles or shafts by the reverse motion thereof, as before described.

I provide my machine with a tongue across the top, (see Q in Fig. 1,) which works with a back pole, such as are used in cane-cultivators, thus dispensing with the neck-yoke that tends to knock the cotton out of the bolls when the team passes over the row.

From the foregoing description it will be seen I provide for operating the several pairs of rollers, so that they may turn on their front faces toward each other upon the plant, as desired.

Having thus described my invention, what I claim as new, and desire to secure by Letters Patent, is—

1. An apparatus for picking cotton, comprising a picking-roll, a feeding-roll opposite the picking-roll, means whereby said rolls may be operated to cause them to turn toward each other at their front sides, and supports for the said rolls whereby they are held in position inclining forwardly from their lower to their upper ends, whereby when they are turned toward each other and moved bodily upon a plant they will exert an upward and backward pull and will come in contact with the plant first at the top and will then pick downwardly, substantially as set forth.

2. In a cotton-picking machine, a feed-roller inclining from its ground end forwardly and upwardly for holding the plant-bolls, and the picking-roller opposing said feed-roller and in close proximity to and parallel with said feed-roller, and means for operating said rollers.

3. A cotton-picking machine comprising feed-rollers and picking-rollers inclined forwardly from their lower toward their upper ends and arranged in pairs of one picking-roller and one feed-roller, one pair being behind the other and the picking-roller of one pair being diagonally opposite the picking-roller of the other pair, and means for supporting the said rollers, substantially as set forth.

4. A cotton-picking machine comprising the framing, and a pair of rollers opposing each other, and in such relation that one roller will press the cotton into contact with the other roller, said rollers being inclined forwardly and upwardly from their lower to their upper ends, whereby to avoid dragging the plants down as the machine moves forward.

5. In a machine for picking cotton, the combination of the picking-roller and the opposite feed-roller having a yielding surface provided with projections by which to feed the plant against the picking-roller, substantially as set forth.

6. In a cotton-picking machine, a feed-roller comprising a core, a plurality of radially-extending springs on said core, and a flexible covering for said springs whose surface is provided with projections for feeding the cotton, substantially as set forth.

7. In a cotton-picking machine, a feeding-roller having a flexible or yielding covering combined with a picking device to which the plants are fed by said roller.

8. In a cotton-picking machine, a feeding-roller having a flexible yielding cover and provided with longitudinal ribs or slats thereon, as set forth.

9. In a cotton-picking machine, the combination of the picking-roller provided with picking devices and arranged at an angle inclining upwardly from its lower rear end toward its upper end, and the opposite feed-roller adjacent to and adapted to feed the cotton to said picking-roller, the feed-roller being also inclined upwardly from its lower rear end toward its upper end, substantially as set forth.

10. A feeding-roller for cotton-pickers, comprising a core, a series of projecting springs thereon, a flexible covering over said springs, and longitudinal ribs or slats on the said cover, substantially as set forth.

11. A feed-roller for cotton-pickers having a yielding surface provided with projections for feeding the cotton.

12. A feed-roller for cotton-pickers having a flexible covering, springs within and supporting said covering, and cotton-feeding projections on said covering.

13. A feed-roller for cotton-pickers, having a flexible yielding covering and springs within and supporting said covering combined with a picking device to which the plants are fed by said roller.

14. The combination in a cotton-picker, of the shell or casing of the picker-roller, the picker-shafts journaled therein, and the disks within the shell and having at their edges the upper and lower cam-surfaces or rails for operating the picker-shafts.

WILLIAM WHARTON HOSKINS.

Witnesses:
    JAS. F. BROWN,
    E. P. HOEFLE.